(12) United States Patent
Sun et al.

(10) Patent No.: US 10,467,763 B1
(45) Date of Patent: Nov. 5, 2019

(54) SYSTEM AND METHOD FOR OPTICAL FLOW ESTIMATION

(71) Applicant: NVIDIA Corporation, Santa Clara, CA (US)

(72) Inventors: Deqing Sun, Providence, RI (US); Xiaodong Yang, San Jose, CA (US); Ming-Yu Liu, Sunnyvale, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/537,986

(22) Filed: Aug. 12, 2019

Related U.S. Application Data

(63) Continuation of application No. 15/942,213, filed on Mar. 30, 2018.

(Continued)

(51) Int. Cl.
*G06T 7/207* (2017.01)
*G06T 7/246* (2017.01)
(Continued)

(52) U.S. Cl.
CPC ............ *G06T 7/207* (2017.01); *G06N 5/046* (2013.01); *G06T 3/0093* (2013.01); *G06T 7/251* (2017.01);
(Continued)

(58) Field of Classification Search
CPC ......... G06T 7/207; G06T 7/246; G06T 7/251; G06T 7/97; G06T 3/0093; G06T 2200/28;
(Continued)

(56) References Cited

U.S. PATENT DOCUMENTS

| 5,500,904 A | 3/1996 | Markandey et al. |
|---|---|---|
| 5,611,000 A | 3/1997 | Szeliski et al. |

(Continued)

FOREIGN PATENT DOCUMENTS

| CN | 106228578 A | 12/2016 |
|---|---|---|
| CN | 106709933 A | 5/2017 |
| WO | WO 2017/172435 A1 | 10/2017 |

OTHER PUBLICATIONS

Helala, et al., "Fast Estimation of Large Displacement Optical Flow Using Dominant Motion Patterns & Sub-Volume PatchMatch Filtering," IEEE Xplore, 14$^{th}$ Conference on Computer and Robot Vision, May 2017, 8 pp.

(Continued)

*Primary Examiner* — Phuoc Tran
(74) *Attorney, Agent, or Firm* — Leydig, Voit & Mayer, Ltd.

(57) ABSTRACT

A method, computer readable medium, and system are disclosed for estimating optical flow between two images. A first pyramidal set of features is generated for a first image and a partial cost volume for a level of the first pyramidal set of features is computed, by a neural network, using features at the level of the first pyramidal set of features and warped features extracted from a second image, where the partial cost volume is computed across a limited range of pixels that is less than a full resolution of the first image, in pixels, at the level. The neural network processes the features and the partial cost volume to produce a refined optical flow estimate for the first image and the second image.

20 Claims, 13 Drawing Sheets

Related U.S. Application Data

(60) Provisional application No. 62/483,145, filed on Apr. 7, 2017.

(51) Int. Cl.
*G06T 7/00* (2017.01)
*G06N 5/04* (2006.01)
*G06T 3/00* (2006.01)

(52) U.S. Cl.
CPC ...... *G06T 7/97* (2017.01); *G06T 2207/10016* (2013.01); *G06T 2207/20016* (2013.01)

(58) Field of Classification Search
CPC . G06T 2207/20084; G06T 2207/20032; G06T 2207/20016; G06T 2207/10016; G06N 3/08; G06N 3/0454; G06N 5/046
See application file for complete search history.

(56) References Cited

U.S. PATENT DOCUMENTS

| | | |
|---|---|---|
| 5,680,487 A | 10/1997 | Markandey |
| 7,103,231 B2 | 9/2006 | Cornog et al. |
| 7,760,911 B2 | 7/2010 | Xiao et al. |
| 7,961,925 B2 | 6/2011 | Chen et al. |
| 8,712,095 B2 | 4/2014 | Gaddy |
| 2013/0215264 A1* | 8/2013 | Soatto .................. G06K 9/4671 348/143 |
| 2018/0137633 A1* | 5/2018 | Chang .................. G06K 9/4628 |

OTHER PUBLICATIONS

Kuang, F., "PatchMatch Algorithms for Motion Estimation and Stereo Reconstruction," Institute for Visualization and Interactive Systems, University of Stuttgart, Jun. 1, 2017, 77 pp.

Brox, et al., "High Accuracy Optical Flow Estimation Based on a Theory for Warping," Computer Vision, ECCV, Lecture Notes in Computer Science, vol. 3024, Springer, Berlin, 2004, 13 pp.

Fischer, et al., "FlowNet: Learning Optical Flow with Convolutional Networks," Cornell University Library, 2015, 13 pp.

Ilg, et al., "FlowNet 2.0: Evolution of Optical Flow Estimation with Deep Networks," Cornell University Library, 2016, 10 pp.

Ranjan, et al., "Optical Flow Estimation using a Spatial Pyramid Network," Cornell University Library, 2016, pp. 1-10.

* cited by examiner

US 10,467,763 B1

SYSTEM AND METHOD FOR OPTICAL FLOW ESTIMATION

CLAIM OF PRIORITY

This application is a continuation of U.S. Non-Provisional application Ser. No. 15/942,213 titled "SYSTEM AND METHOD FOR OPTICAL FLOW ESTIMATION," filed Mar. 30, 2018 that claims the benefit of U.S. Provisional Application No. 62/483,145 titled "PYRAMIDAL CNN MODEL FOR OPTICAL FLOW ESTIMATION," filed Apr. 7, 2017, the entire contents of which is incorporated herein by reference.

FIELD OF THE INVENTION

The present invention relates to optical flow and techniques for estimating optical flow for images.

BACKGROUND

Optical flow estimation is a core computer vision problem and has many applications, e.g., in autonomous driving, video editing, and action recognition. Most top-performing conventional techniques for estimating optical flow adopt an energy minimization approach. However, optimizing a complex energy function is usually computationally expensive for real-time applications. Other conventional approaches have large memory requirements for storing a system model. The large memory requirements cannot always be satisfied by embedded and mobile devices. There is a need for addressing these issues and/or other issues associated with the prior art.

SUMMARY

A method, computer readable medium, and system are disclosed for estimating optical flow for images. A first pyramidal set of features is generated for a first image and a partial cost volume for a level of the first pyramidal set of features is computed, by a neural network, using features at the level of the first pyramidal set of features and warped features extracted from a second image, where the partial cost volume is computed across a limited range of pixels that is less than a full resolution of the first image, in pixels, at the level. The neural network processes the features and the partial cost volume to produce a refined optical flow estimate for the first image and the second image.

DETAILED DESCRIPTION

An optical flow estimation system estimates the two-dimensional (2D) motion of pixels between two images. A compact but effective convolutional neural network (CNN) model for optical flow estimation is described that exploits the principles of pyramid structures, warping, and correlation. Features extracted from a first image and features extracted from a second image are both stored as pyramidal structures of image features. The CNN model uses an upsampled optical flow computed for the previous (l–1) level of the pyramid structures to warp the features of the second image for the lth level. The CNN model computes a partial cost volume based on the correlation between features of the first image and the warped features of the second image. The correlation output provides strong cues to estimate the flow increment and is processed by convolution layers to refine the current optical flow. A method, computer-readable medium, and system embodiment is disclosed. The algorithm may be executed by a GPU, CPU, or any processor capable of implementing the CNN model.

Figure 1A:
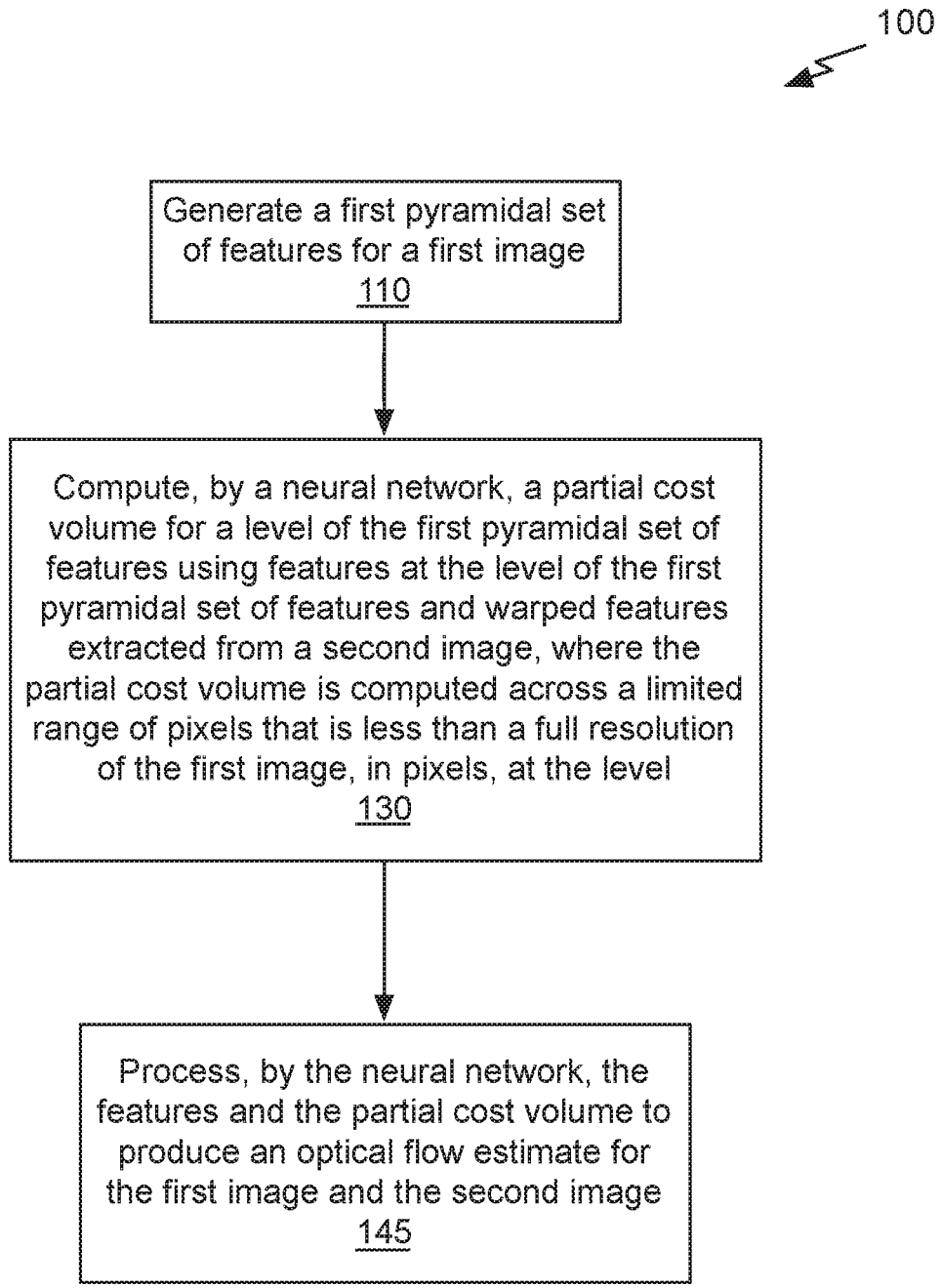
FIG. 1A illustrates a flowchart of a method for estimating optical flow, in accordance with one embodiment.

FIG. 1A illustrates a flowchart of a method 100 for estimating optical flow, in accordance with one embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of implementing a neural network model. Furthermore, persons of ordinary skill in the art will understand that any system that performs method 100 is within the scope and spirit of embodiments of the present invention.

At step 110, a first pyramidal set of features is generated for a first image. In one embodiment, a second pyramidal set of features is also generated for a second image, where the second image is immediately after the first image in a video sequence. A pyramidal set of features is generated to have L levels, where each level l includes feature representations associated with a different resolution (in pixels) of the image. In one embodiment, the bottom (l=1) level of the pyramidal set of features is the first image. A higher (l=2) level of the pyramidal set of features is generated by convolving the image data (i.e., color and/or depth values for each pixel in the first image) with a filter. In one embodiment, the filter is 3×3 pixels and a stride of 2 is used to generate one or more features for each application of the filter. In one embodiment, each subsequent (l+1) level in the pyramidal set of features is generated by downsampling the features from the lower (l) level in the pyramidal set of features.

In contrast with a conventional image pyramid, where each level is a two-dimensional array of color values generated by downsampling color values of a higher resolution image, each level of the feature pyramid is three-dimensional. The third dimension is a number of channels, where each channel corresponds to a different feature for the same pixel location. In one embodiment, the pyramidal set of features is generated by a CNN having multiple layers and each layer of the neural network generates one channel of the features. In one embodiment, the number of feature channels in a pyramidal set of features having 7 levels is 16 at the bottom layer (l=1), increasing to 32, 64, 96, 128, and 196 at the top (l=7) level. Features at higher levels of the pyramidal set of features tend to capture global structures within the image, whereas features at lower levels describe fine details of the image.

A drawback of conventional image pyramid having fixed values at each level is that the raw images used to generate the conventional image pyramid do not provide good features to establish correspondence between different images in a video sequence, particularly in the presence of shadows and lighting changes. Therefore, the conventional image pyramid is replaced with a feature pyramid (i.e., pyramidal set of features) and, when the feature pyramid is generated using a neural network, the parameters used to generate the features may be learned through training.

At step 130, a partial cost volume for a level of the first pyramidal set of features is computed, by a neural network, using features at the level of the first pyramidal set of features and warped features extracted from a second image, where the partial cost volume is computed across a limited range of pixels that is less than a full resolution of the first image, in pixels, at the level. The warping and limited range of pixels is described in more detail in conjunction with FIG. 1B.

Conventional optical flow estimation techniques compute a full cost volume, building the full cost volume at a single scale, which is both computationally expensive and memory intensive. By contrast, constructing the partial cost volume at multiple pyramid levels results in optical flow estimation models that are computationally accurate and efficient.

At step 145, the neural network processes the features and the partial cost volume, to produce an optical flow estimate for the first image and the second image. In one embodiment, the optical flow estimation technique iteratively processes each level of the feature pyramid structures (i.e., each pyramidal set of features), starting at the top level (l=L) for the first image and the second image using an optical flow estimate from the previous iteration to refine the optical flow estimate until the target level is reached (l=1). At the start of the process, the optical flow estimate is initialized. In one embodiment, the optical flow estimate is further processed to produce a refined optical flow estimate.

For the first iteration, the top (l=L) level of the feature pyramid for the second image is warped toward the top level of the feature pyramid for the first image using the initial optical flow estimate. Importantly, the feature pyramid structures and warping enable a reduction in the search range (in pixels) used to compute the partial cost volume. The partial cost volume is computed for the top level using the top level of the first feature pyramid and the warped top level of the second feature pyramid. The optical flow estimate is then computed using the top level of the first feature pyramid, the cost volume of the top level, and the initial optical flow estimate. The computed optical flow estimate is then upsampled and the process is repeated (starting at the warping) for the (l=l−1) level of the feature pyramids. The process continues until the bottom level of the feature pyramids is used to produce a final optical flow estimate.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
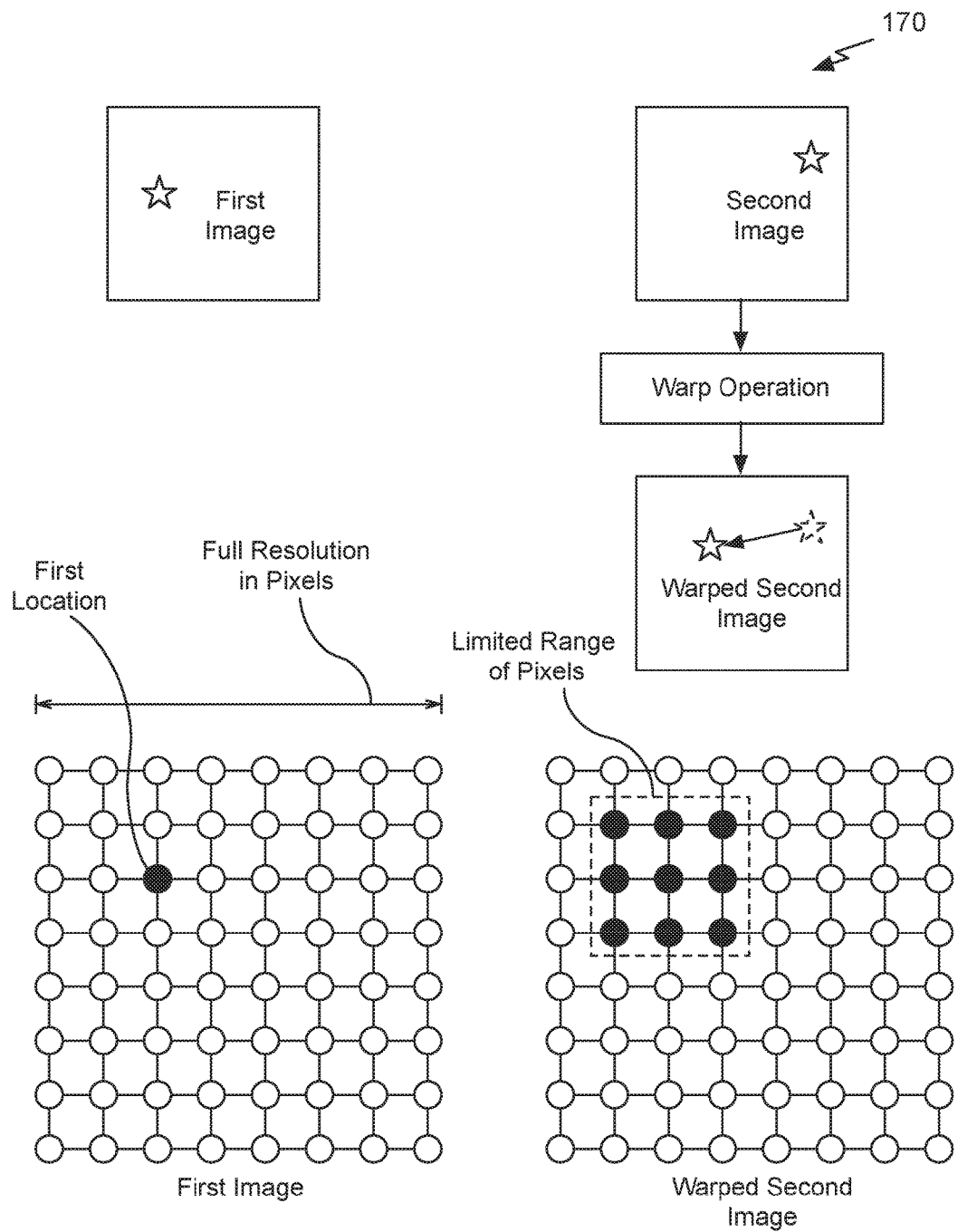
FIG. 1B is a conceptual diagram of illustrating a warped second image and limited range of pixels used to compute a partial cost volume, in accordance with one embodiment.

FIG. 1B is a conceptual diagram 170 illustrating a warped second image and limited range of pixels used to compute a partial cost volume, in accordance with one embodiment. An object (star) at a first location in the first image has moved to a second location in a second image, where the first and second images are included in a video sequence. A warping operation is performed on the second image to move the object from the second location to a third location that is closer to the first location. Note that although the object may be assumed to be represented as image data, in one embodiment, the object may be represented as one or more features generated for a level of a feature pyramidal structure. Each feature may correspond to a pixel location in the first and second images. The features of the second image for a highest level of the feature pyramidal structure are warped towards the first image using an initial optical flow. For subsequent optical flow estimates, the features of the second image for a subsequent (i.e., next lower) level of the feature pyramidal structure are warped towards the first image using the optical flow estimate computed for the higher level.

To estimate the optical flow, movement of the object from the first location in the first image to the second location in the second image is calculated. The first location is known and the second location (i.e., location of the object in the second image) can be determined based on the warp operation and a difference between the first and third locations (i.e., locations of the object in first image and the warped second image). As a result of the warping operation, the object in the warped second image is closer to the first location, so it is not necessary to search the entire warped second image to identify the object and the third location. Instead, a limited range of pixels surrounding the first location may be searched.

As shown in FIG. 1B, in one embodiment, the limited range of pixels is a 3×3 pixel region centered at the first location. Importantly, the limited range is less than the full resolution, in pixels, of the first image, where the full resolution is one of the dimensions (e.g., height or width) of the first image. Note that the dimensions of the first image and the warped second image for each level of the feature pyramids are equal. In the context of the following description, the limited range of pixels is applied to a level of the second pyramidal set of features that is warped. The limited range of pixels is centered at a first location corresponding to the first location in the level of the first pyramidal set of features.

Figure 1C:
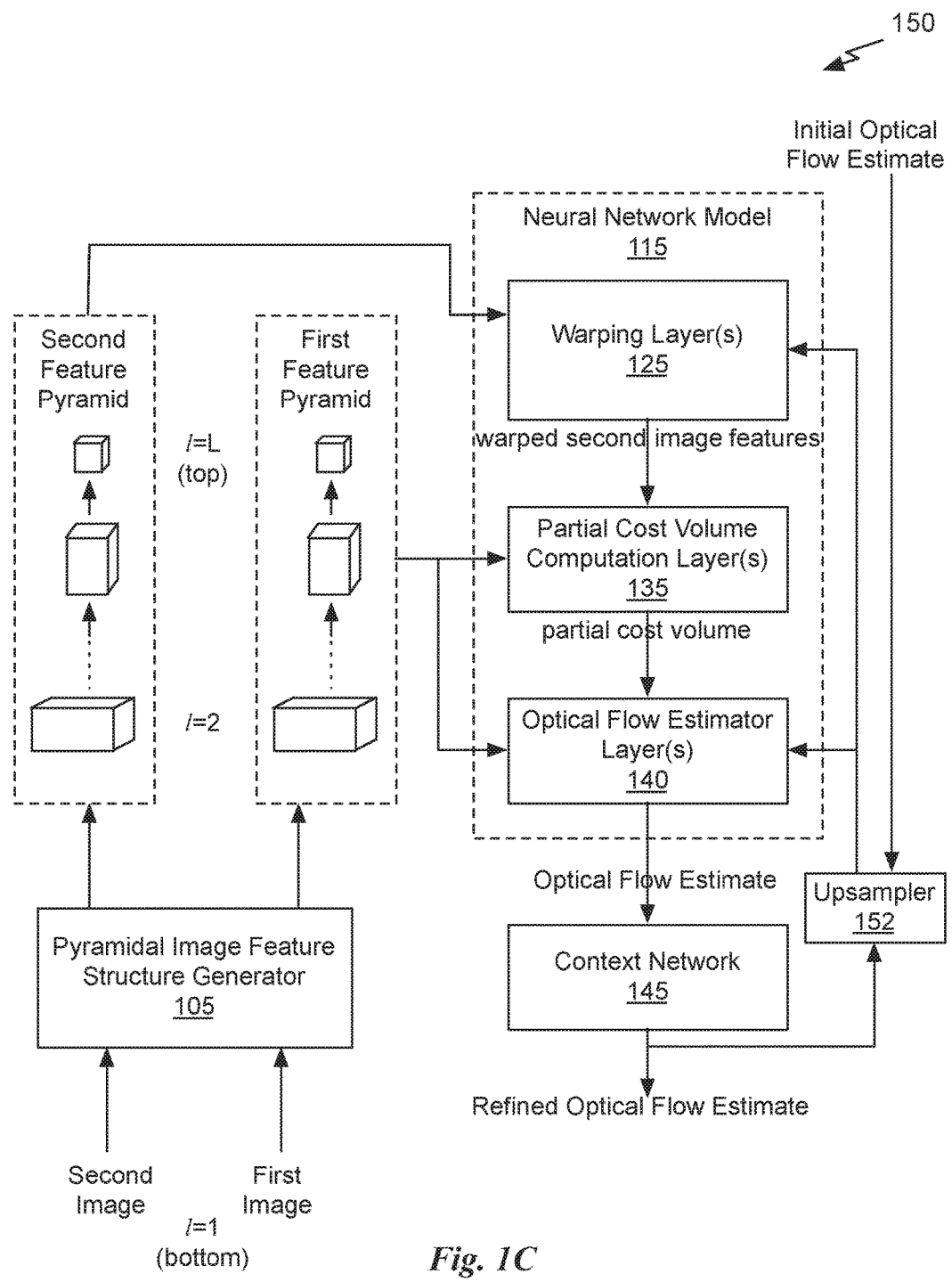
FIG. 1C illustrates a block diagram of an optical flow system, in accordance with one embodiment.

FIG. 1C illustrates a block diagram of an optical flow system 150, in accordance with one embodiment. The optical flow system 150 includes a pyramidal image feature structure generator 105, a neural network model 115, an upsampler 152, and a context network 145. The neural network model 115 comprises multiple layers including one or more warping layer(s) 125, one or more partial cost volume computation layer(s) 135, and one or more optical flow estimator layer(s) 140. In one embodiment, the warping layer(s) 125 comprises a single layer, the partial cost volume computation layer(s) 135 comprises a single layer, and the optical flow estimator layer(s) 140 comprises a CNN. In one embodiment, the context network 145 is omitted and the optical flow estimate generated by the neural network model 115 is used as the refined optical flow estimate. The context network 145 is configured to post-process an optical flow estimate output by the neural network model 115, and may perform median filtering, weighted median filtering, and/or bilateral filtering to generate the refined optical flow estimate.

In one embodiment, the pyramidal image feature structure generator 105 is implemented using a neural network, starting with the first and second images at the bottom level and generating each higher level until the top level is reached. The optical flow estimation technique is iterative, starting at a coarse level of detail (top level of the feature pyramid) and finishing at a fine level of detail, as described in detail in conjunction with FIG. 2A. Conventional techniques first compute two (Gaussian) image pyramids for the first and the second images. In contrast, the pyramidal image feature structure generator 105 is a neural network configured to construct feature pyramids, learning the filters that are used to compute the features from a training dataset. In one embodiment, features are extracted from the first image and the second image at the bottom level by a convolutional layer and then the extracted features are downsampled by another convolutional layer to generate the features for the subsequent level. Thereafter, each level is downsampled by a convolutional layer to generate the features for the level above until the top level is reached. If the convolutional layers were replaced by fixed Gaussian filters, a conventional image pyramid could be generated. FIG. 2B illustrates one embodiment of the pyramidal image feature structure generator 105.

In one embodiment, for processing by the neural network model 115, the top level (l=L), the initial optical flow estimate is initialized to 0 and provided to the warping layer(s) 125 and optical flow estimator layer(s) 140 by the upsampler 152. Beginning at the top level of the feature pyramids, the features of the second image at the current level are warped using the initial optical flow estimate. For subsequent levels of the feature pyramids, the features of the second image at the current level are warped using the refined optical flow estimate, $w^l$ computed by the optical flow system 150 for the higher pyramid level that is upsampled by the upsampler 152.

In contrast, conventional techniques using image pyramids use spatial and temporal differences of the two small images at the top levels of the image pyramids to compute the initial optical flow. At the next pyramid level, the optical flow is upsampled from the higher level, and used to warp the second image toward the first image. Spatial and temporal differences are computed for the first image and the warped second image and the differences and the upsampled optical flow are used to compute the new optical flow estimate at the current level. However, the temporal difference computed by the conventional optical flow techniques, only allow small, often subpixel, changes around the upsampled flow.

Instead of computing the temporal difference between the first image and the warped second image, the partial cost volume computation layer(s) 135 computes the correlation between features of the first image and features of the warped second image. The partial cost volume represents the correlation, and, together with the upsampled optical flow estimate provided by the upsampler 152 and features of the first image, the partial cost volume is input to the optical flow estimator layer(s) 140 to predict the new optical flow estimates. Computation of the partial cost volume enables changes that are as large as the range of correlation around the unsampled optical flow.

The warping layer(s) 125 warps the features of the second image, $c_2^{l-1}$ toward the first image using the upsampled optical flow from the lth level.

$$c_w^{l-1}(X) = c_2^{l-1}(x + \uparrow w^l(X)), \qquad (1)$$

where $\uparrow w^l$ denotes the upsampled and scaled optical flow from the lth level and is zero at the top level. The bilinear interpolation method may be used to implement the warping operation and compute the gradients for the features and optical flow estimates for backpropagation during training of the pyramidal image feature structure generator 105. For non-translational motion, warping can compensate some geometric distortions and place image patches at the correct scale.

At the lth pyramid level, the partial cost volume computation layer(s) 135 computes the partial cost volume by computing the correlation using features of the first image, $c_1^l$ toward and warped features of the second image, $c_w^l$:

$$cv^l(x_1, x_2) = \frac{1}{N}(c_1^l(x_1))^T c_w^l(x_2), \qquad (2)$$

Where T is the transpose operator and N is the length of the column vector $c_1^l$ ($x_1$). For a seven level (L=7) feature pyramid, a partial cost volume is computed with a limited range of d pixels, i.e., $|x_1 - x_2|_\infty \leq d$. Note that a one-pixel motion at the top level corresponds to 64 ($2^6$) pixels at the full resolution first and second images. Thus, d can be set to a small value.

To obtain the optical flow estimate $w^l$ at the lth pyramid level, the features of the first image, the partial cost volume, and the upsampled optical flow estimate are input the optical flow estimator layer(s) 140. In one embodiment, the parameters used by the optical flow estimator layer(s) 140 for processing different levels of the feature pyramids are not shared, so separate parameters are used for each level. In one embodiment, within the optical flow estimator layer(s) 140, the inputs to every convolutional layer are the output of and the input to the previous layer. The optical flow is estimated for each level by the neural network model 115 until the bottom level is reached. In one embodiment, the optical flow estimator layer(s) 140 outputs quarter resolution optical flow and bilinear interpolation is used to obtain the full-resolution optical flow estimate. In one embodiment, the context network 145 is omitted and the upsampler 152 receives the optical flow estimate directly from the optical flow estimator layer(s) 140.

As context is crucial for optical flow estimation, in one embodiment, the context network 145 is employed at the desired pyramid level (i.e., the bottom level), to effectively enlarge the receptive field size of each output unit. In one embodiment, the context network 145 is a feed-forward CNN, that receives the estimated optical flow and features of the second to last layer ($f^2$) from the optical flow estimator layer(s) 140, and outputs the refined optical flow estimate.

In one embodiment, the design of the context network 145 is based on dilated convolutions and includes seven convolutional layers. The spatial kernel for each convolutional layer is 3×3 and the layers have different dilation constants.

A convolutional layer with a dilation constant k means that an input unit to a filter in the layer are k-unit apart from the other input units to the filter in the layer, both in vertical and horizontal directions. Convolutional layers with large dilation constants enlarge the receptive field of each output unit without incurring a large computational burden. In one embodiment, from bottom to top, the dilation constants are 1, 2, 4, 8, 16, 1, and 1.

During training of the optical flow system 150, the neural network parameters (e.g., weights) for the neural network model 115 and the pyramidal image feature structure generator 105 are learned, as well as the neural network parameters of the context network 145. Compared with conventional techniques that use energy minimization in place of the partial cost volume computation layer(s)135 and optical flow estimator layer(s) 140, the warping, partial cost volume, and layers of the optical flow estimator layer(s) 140 within the neural network model 115 are computationally light. Further, the warping layer(s) 125 and partial cost volume computation layer(s) 135 have no learnable parameters, significantly reducing the size of the neural network model 115.

Assume that $\Theta$ is the set of all the learnable parameters in the optical flow system 150 including the pyramidal image feature structure generator 105 and the optical flow estimator layer(s) 140 at different pyramid levels. Let $w_\Theta^l$ denote the optical flow field at the lth pyramid level predicted by the neural network model 115, and $w_{GT}^l$ the corresponding supervision signal. A multiscale training loss may be computed:

$$\mathcal{L}(\Theta) = \sum_{l=l_0}^{L} \alpha_l \sum_x |w_\Theta^l(x) - w_{GT}^l(x)|_2 + \gamma|\Theta|_2 \quad (3)$$

where $|w_\Theta^l(x) - w_{GT}^l(x)|_2$ computes the L2 norm of a vector and the second term regularizes parameters of the pyramidal image feature structure generator 105 and the optical flow estimator layer(s) 140. For fine-tuning, the following robust training loss may be used:

$$\mathcal{L}(\Theta) = \sum_{l=l_0}^{L} \alpha_l \sum_x (|w_\Theta^l(x) - w_{GT}^l(x)| + \in)^q + \gamma|\Theta|_2 \quad (4)$$

Where $|w_\Theta^l(x) - w_{GT}^l(x)|^q$ denotes the L1 norm, q<1 gives less penalty to outliers, and $\in$ is a small constant.

In one embodiment, the weights in the training loss computation of equation (3) are set to be $\alpha_6=0.32$, $\alpha_5=0.08$, $\alpha_4=0.02$, $\alpha_3=0.01$, and $\alpha_2=0.005$. These settings give higher weights to loss terms at the second and third pyramid levels, accounting for the number of pixels at each level. The ground truth flow may be scaled by 20 and downsampled to obtain the supervision signals at different levels. Note that, in one embodiment, no further scaling of the supervision signal is performed at each level. As a result, the upsampled optical flow estimate is scaled at each pyramid level for input to the warping layer(s) 125. For example, at the second level, the upsampled flow is scaled from the third level by a factor of 5 (=20/4) before warping features of the second image. The trade-off weight $\gamma$ is set to be 0.0004. For the partial cost volume computation, the search range d is set to 4 pixels at each level.

Figure 2A:
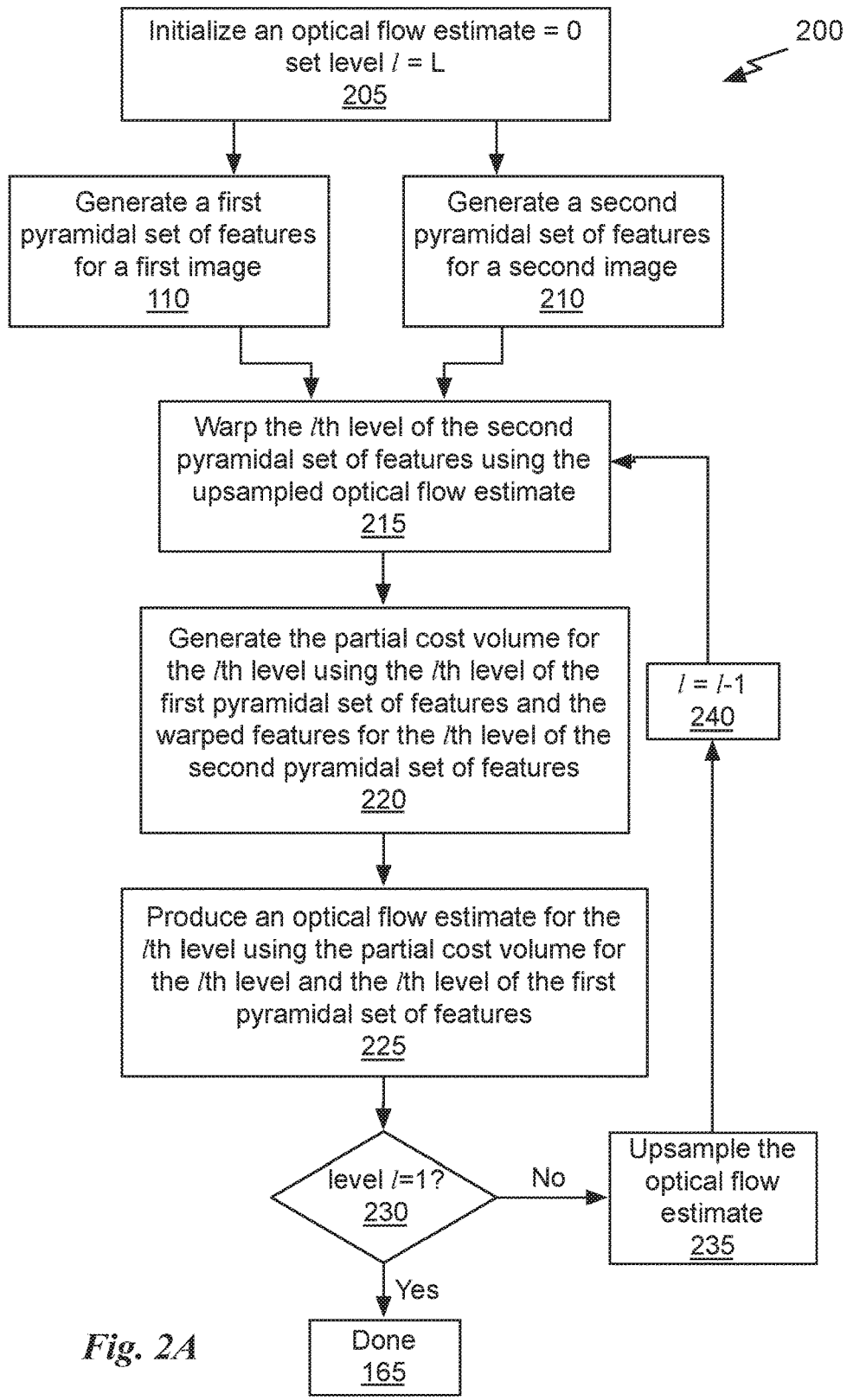
FIG. 2A illustrates a flowchart of a method for estimating optical flow, in accordance with one embodiment.
Figure 2B:
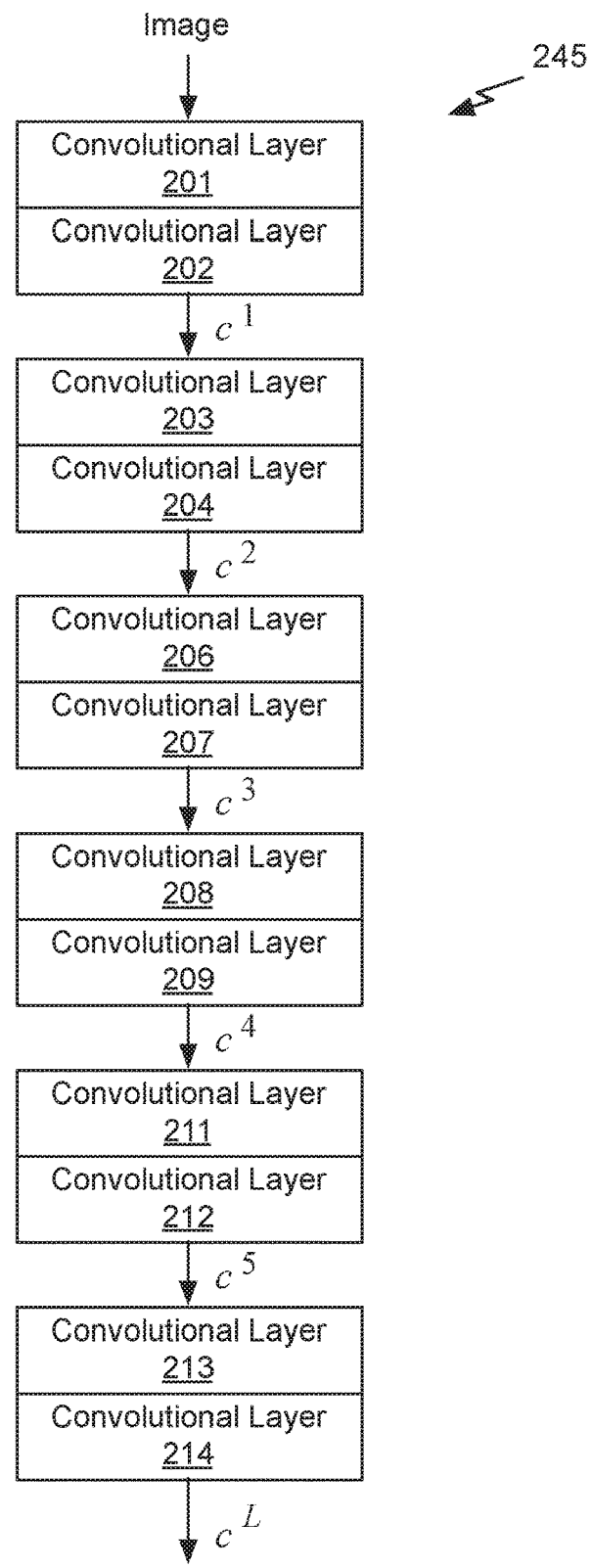
FIG. 2B illustrates a block diagram of a feature pyramid extraction network, in accordance with one embodiment.

FIG. 2A illustrates a flowchart of a method 200 for estimating optical flow, in accordance with one embodiment. Although method 200 is described in the context of a processing unit, the method 200 may also be performed by a program, custom circuitry, or by a combination of custom circuitry and a program. For example, the method 200 may be executed by a GPU (graphics processing unit), CPU (central processing unit), or any processor capable of implementing a neural network model. Furthermore, persons of ordinary skill in the art will understand that any system that performs method 200 is within the scope and spirit of embodiments of the present invention.

At step 205, the optical flow estimate provided to the warping layer(s) 125 and the optical flow estimator layer(s) 140 is initialized to zero and the feature pyramid level l is set to the top level L. At step 110, a first pyramidal set of features is generated by the pyramidal image feature structure generator 105 for a first image. At step 210, a second pyramidal set of features, for a second image, is generated by the pyramidal image feature structure generator 105. The first and second pyramidal sets of features may be generated in parallel or in series.

At step 215, the warping layer(s) 125 warps the lth level of the second pyramidal set of features using the upsampled optical flow estimate (or the initialized optical flow estimate when l=L) to generate the warped second image features. At step 220, the partial cost volume computation layer(s) 135 generates the partial cost volume for the lth level using the lth level of the first pyramidal set of features and the warped second image features (i.e., warped features for the lth level of the second pyramidal set of features). At step 225, the optical flow estimator layer(s) 140 produces an optical flow estimate for the lth level using the partial cost volume for the lth level and the lth level of the first pyramidal set of features. In one embodiment, the context network 145 is omitted and the optical flow estimate produced by the optical flow estimator layer(s) 140 is used as the refined optical flow estimate.

At step 230, the optical flow system 150 determines if the bottom level of the feature pyramid has been processed, and, if so, the optical flow estimate is final. Otherwise, at step 235, the upsampler 152 upsamples the optical flow estimate. At step 240, the optical flow system 150 decrements the level l and returns to step 215 to repeat steps 215 through 225 for another level.

FIG. 2B illustrates a block diagram 245 of a feature pyramid extraction neural network, in accordance with one embodiment. In one embodiment, the pyramidal image feature structure generator 105 is implemented as the block diagram 245. Although the block diagram 245 is described in the context of processing units, the block diagram 245 may also be performed by a program, custom circuitry, or by a combination of custom circuitry and a program.

An image is input to a convolutional layer 201 that downsamples the image. In one embodiment, a 3×3×3 convolutional filter is used to perform a 2× downsampling on a 512×512 pixel image. The downsampled image is processed by a convolutional layer 202. In one embodiment, the convolutional layer 202 performs a 16×3×3 convolution operation on the downsampled image to extract the features $c^1$. In one embodiment, the image includes 3 channels (e.g., red, green, blue color channels) and the features $c^1$ includes 16 channels that are each 256×256 pixels.

The features $c^1$ is input to a convolutional layer 203 that downsamples the features $c^1$. In one embodiment, a 16×3×3 convolutional filter is used to perform a 2× downsampling on the features $c^1$. The downsampled features $c^1$ are processed by a convolutional layer 204. In one embodiment, the convolutional layer 204 performs a 32×3×3 convolution operation on the downsampled features $c^1$ to extract the features $c^2$. In one embodiment, the features $c^2$ includes 32 channels that are each 128×128 pixels.

The features $c^2$ is input to a convolutional layer 206 that downsamples the features $c^2$. In one embodiment, a 32×3×3 convolutional filter is used to perform a 2× downsampling on the features $c^2$. The downsampled features $c^2$ are processed by a convolutional layer 207. In one embodiment, the convolutional layer 207 performs a 64×3×3 convolution operation on the downsampled features $c^2$ to extract the features $c^3$. In one embodiment, the features $c^3$ includes 64 channels that are each 64×64 pixels.

The features $c^3$ is input to a convolutional layer 208 that downsamples the features $c^3$. In one embodiment, a 64×3×3 convolutional filter is used to perform a 2× downsampling on the features $c^3$. The downsampled features $c^3$ are processed by a convolutional layer 209. In one embodiment, the convolutional layer 209 performs a 96×3×3 convolution operation on the downsampled features $c^3$ to extract the features $c^4$. In one embodiment, the features $c^4$ includes 96 channels that are each 32×32 pixels.

The features $c^4$ is input to a convolutional layer 211 that downsamples the features $c^4$. In one embodiment, a 64×3×3 convolutional filter is used to perform a 2× downsampling on the features $c^4$. The downsampled features $c^4$ are processed by a convolutional layer 212. In one embodiment, the convolutional layer 212 performs a 128×3×3 convolution operation on the downsampled features $c^4$ to extract the features $c^5$. In one embodiment, the features $c^5$ includes 128 channels that are each 16×16 pixels.

The features $c^5$ is input to a convolutional layer 213 that downsamples the features $c^5$. In one embodiment, a 128×3×3 convolutional filter is used to perform a 2× downsampling on the features $c^5$. The downsampled features $c^5$ are processed by a convolutional layer 214. In one embodiment, the convolutional layer 214 performs a 192×3×3 convolution operation on the downsampled features $c^5$ to extract the features $c^6$. In one embodiment, the features $c^6$ includes 192 channels that are each 8×8 pixels.

Figure 2C:
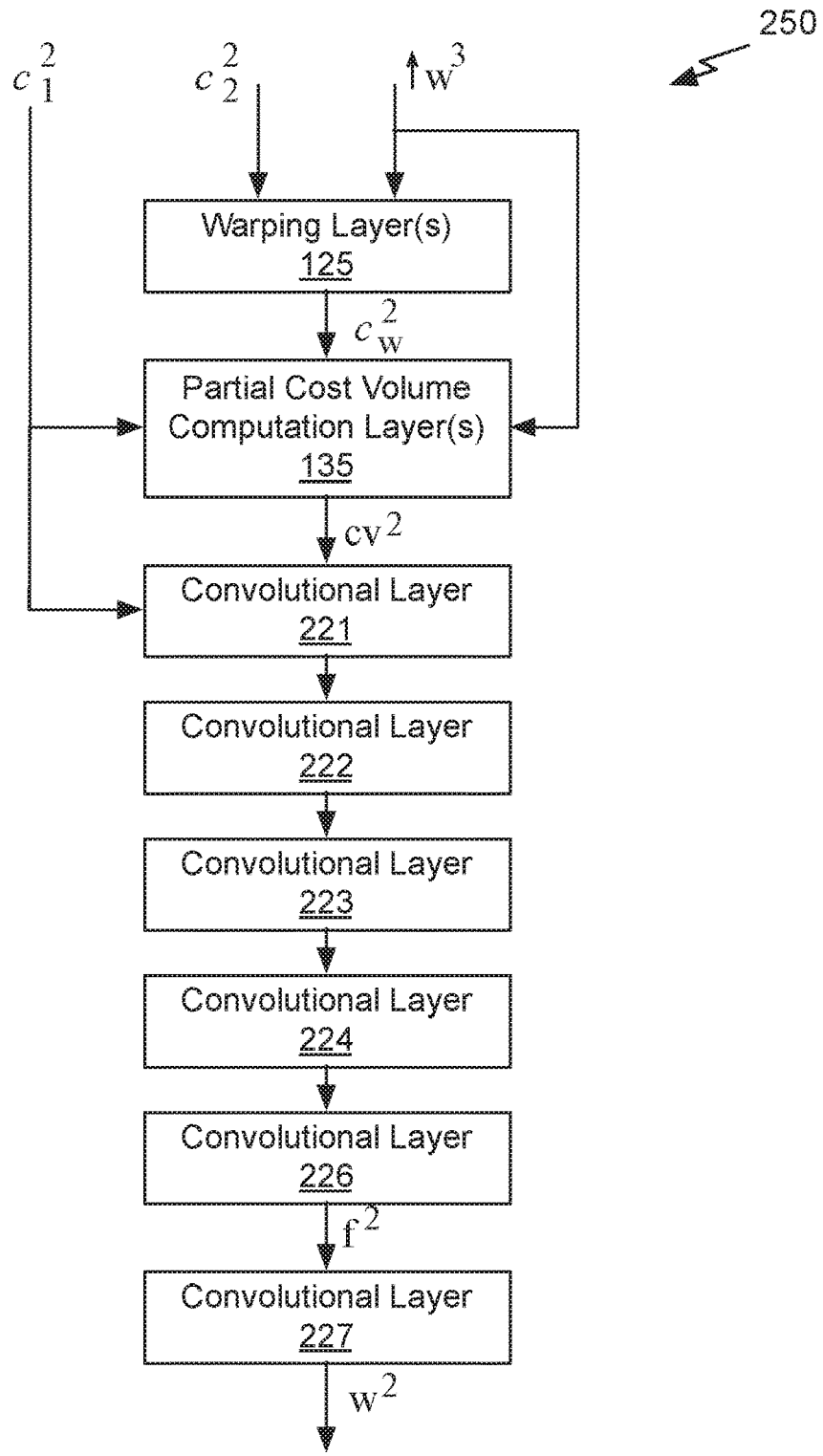
FIG. 2C illustrates a block diagram of a warping, partial cost volume, and flow estimator network, in accordance with one embodiment.

FIG. 2C illustrates a block diagram 250 of a warping, partial cost volume, and flow estimator neural network, in accordance with one embodiment. In one embodiment, the neural network model 115 comprises the block diagram 250. Although the block diagram 250 is described in the context of processing units, the block diagram 250 may also be performed by a program, custom circuitry, or by a combination of custom circuitry and a program.

The processing units in the block diagram 250 apply the same operation at each level of the feature pyramid, warping the features of the second image toward the features of the first image using the upsampled optical flow estimate from the lower level, computing the correlation between features of the first image and the warped features of the second image, and then decoding the optical flow at the current level using the correlation and the upsampled flow and features.

In one embodiment the block diagram 250 is configured to estimate the optical flow at level l=2 of the feature pyramid. At other levels, the block diagram 250 has the same structure except for the top level, which does not use the upsampled optical flow and instead directly computes the partial cost volume using features of the first and second images.

The warping layer(s) 125 receives the features for the first image at the second level, $c_1^2$, the features for the second image at the second level, $c_2^2$, and the upsampled optical flow estimate from the third (previous) level, $\uparrow w^3$. The warping layer(s) 125 generates the warped features for the second image at the second level, $c_w^2$. In one embodiment, the features for the first and second images at the second level include 32 channels that are each 128×128 pixels, the upsampled optical flow estimate from the third level includes 2 channels of features that are 128×128 pixels, and the warped features for the second image at the second level includes 32 channels that are 128×128 pixels.

The partial cost volume computation layer(s) 135 receives the warped features for the second image at the second level, $c_w^2$, the features for the first image at the second level, $c_1^2$, and the upsampled optical flow estimate from the third (previous) level, $\uparrow w^3$. The partial cost volume computation layer(s) 135 computes the partial cost volume at the second level, $cv^2$. In one embodiment, the partial cost volume at the second level includes 81 channels of 128×128 pixels.

The partial cost volume at the second level and the features of the first image at the second level are input to a sequence of convolutional layers including a convolutional layer 221, a convolutional layer 222, a convolutional layer 223, a convolutional layer 224, a convolutional layer 226, and a convolutional layer 227 to produce an optical flow estimate for the second layer, $w^2$. In one embodiment, the convolutional layers 221, 222, 223, 224, 226, and 227 are configured to perform convolutional operations of 115×3×3 for 128 channels, 128×3×3 for 128 channels, 128×3×3 for 96 channels, 96×3×3 for 64 channels, 64×3×3 for 32 channels, and 32×3×3 for 2 channels, respectively to produce the optical flow estimate for the second layer having 2 channels of 128×128 pixels. The output of the next to last convolution layer 226, $f^2$ is provided as an input to the context network 145.

Figure 2D:
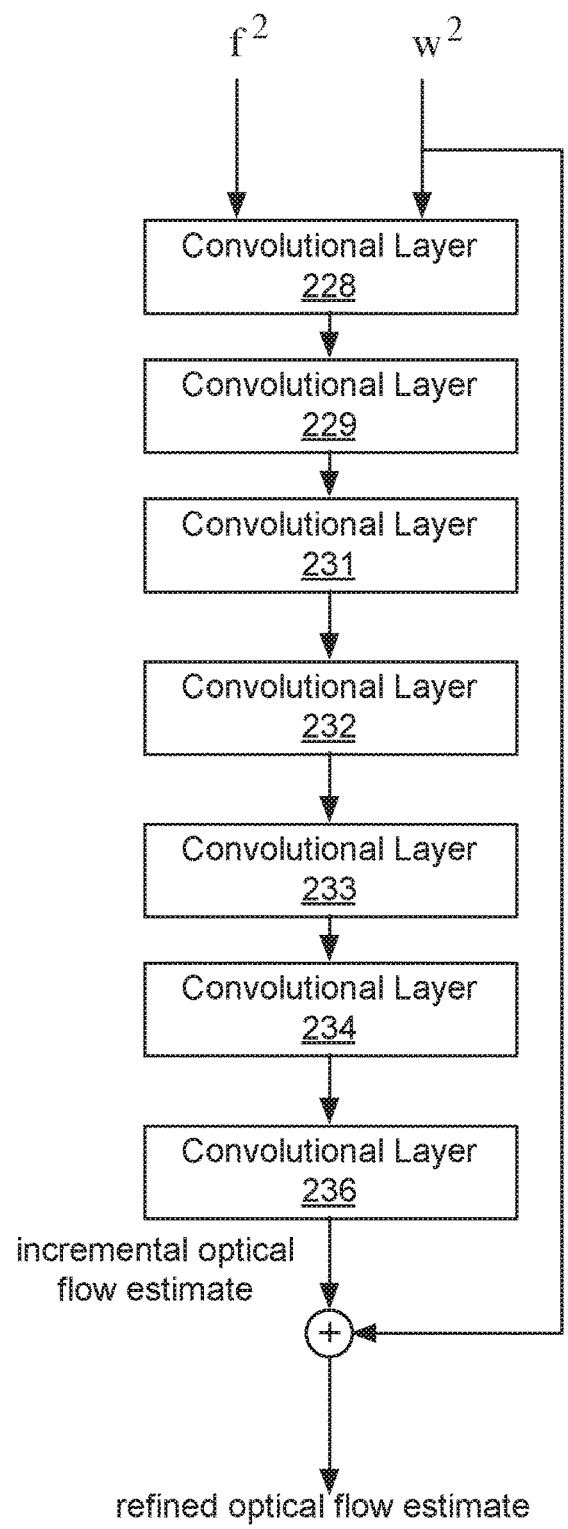
FIG. 2D illustrates a block diagram of a context network, in accordance with one embodiment.

FIG. 2D illustrates a block diagram 255 of a context network, in accordance with one embodiment. In one embodiment, the context network 145 comprises the block diagram 255. Although the block diagram 255 is described in the context of processing units, the block diagram 255 may also be performed by a program, custom circuitry, or by a combination of custom circuitry and a program.

In one embodiment, the context network 145 includes a sequence of convolutional layers including a convolutional layer 228, a convolutional layer 229, a convolutional layer 231, a convolutional layer 232, a convolutional layer 233, a convolutional layer 234, and a convolutional layer 236 to produce an incremental optical flow estimate for the second level, $\delta w^2$. The incremental optical flow estimate for the second level is summed with the optical flow estimate for the second level to produce a refined optical flow estimate for the second layer, $\hat{w}^2$. In one embodiment, the spatial kernel for each convolutional layer is 3×3 and the convolutional layers have different dilation constants.

In one embodiment, the convolutional layers 228, 229, 231, 232, 233, 234, and 236 are configured to perform convolutional operations of 34×3×3, 128×3×3, 128×3×3, 128×3×3, 96×3×3, 64×3×3, and 32×3×3, respectively to produce the refined optical flow estimate for the second layer having 2 channels of 128×128 pixels.

The optical flow system 150 uses the optical flow estimate for the previously processed feature pyramid layer to warp the features of the second image. The warped features and features of the first image are then used to construct the partial cost volume, which is processed to estimate the optical flow. The use of feature pyramid structures instead of image pyramid structures combined with computation of a partial cost volume provides advantages of increased accuracy, reduce model size, and reduced execution time for the optical flow system 150. While constructing the full cost volume has been thought to be computationally prohibitive for real-time optical flow estimation, computation of the partial cost volume limiting the search range to a small number of pixels at each feature pyramid level. The warping layer(s) 125 links different levels of the feature pyramids and enables the estimation of large motion.

Parallel Processing Architecture

Figure 3:
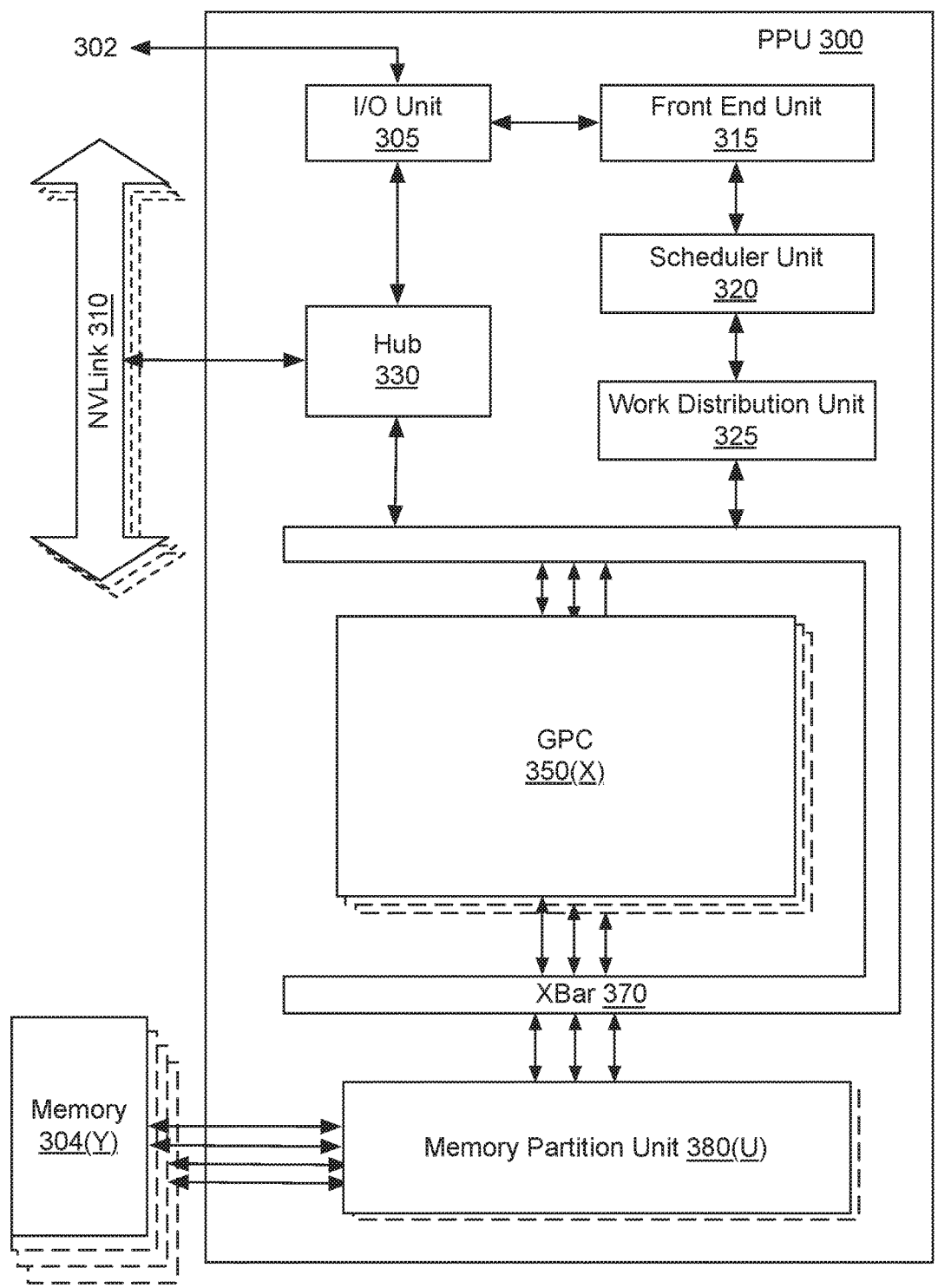
FIG. 3 illustrates a parallel processing unit, in accordance with one embodiment.

FIG. 3 illustrates a parallel processing unit (PPU) 300, in accordance with one embodiment. In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In one embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In one embodiment, the I/O unit 305 may communicate with one or more other processors, such as one or more the PPUs 300 via the interconnect 302. In one embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In one embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the host interface unit 310 may be configured to access the buffer in a system memory connected to the interconnect 302 via memory requests transmitted over the interconnect 302 by the I/O unit 305. In one embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. In one embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In one embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
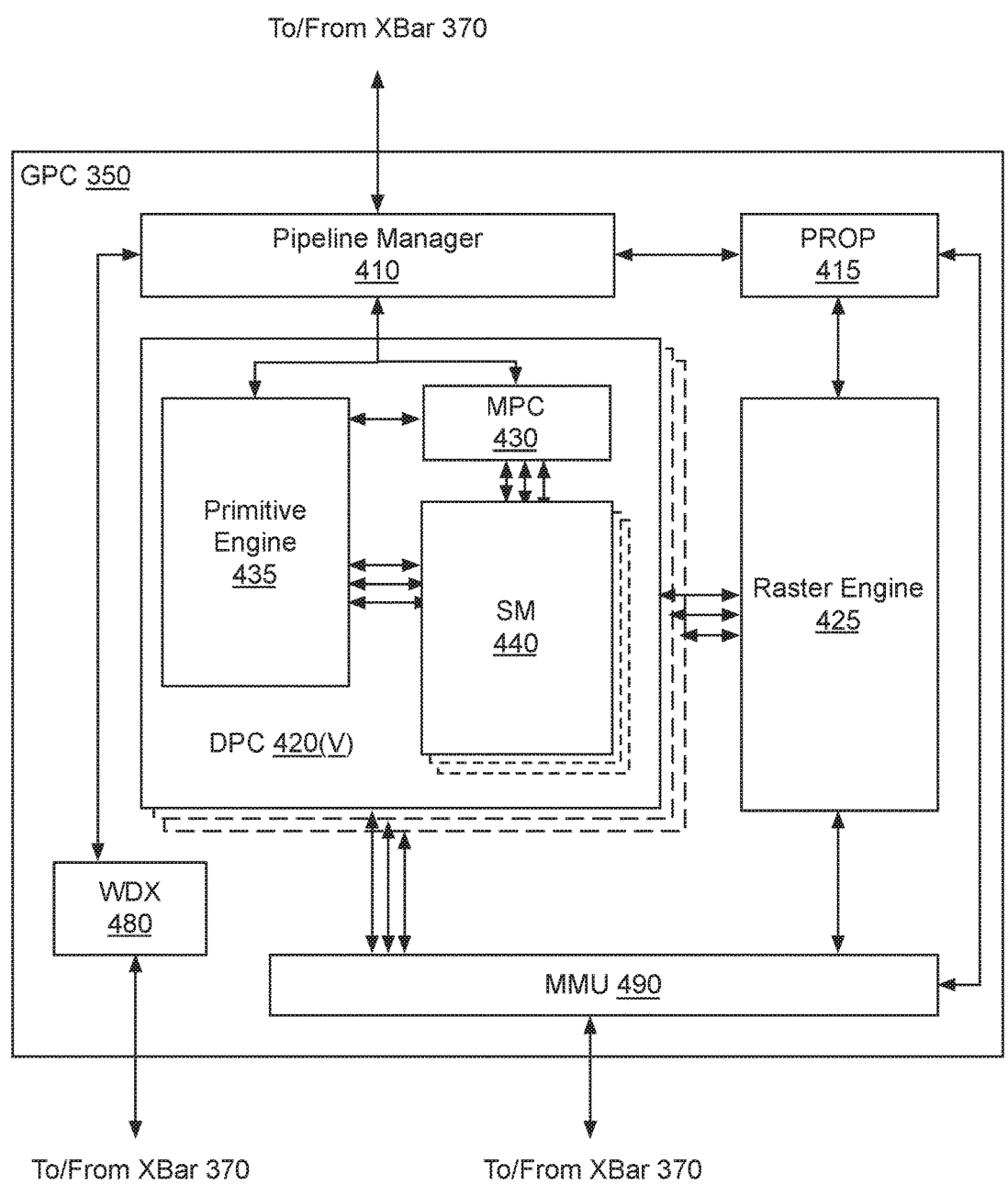
FIG. 4A illustrates a general processing cluster within the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more DPCs 420 for processing tasks allocated to the GPC 350. In one embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In one embodiment, the pipeline manager 410 may configure at least one of the one or more DPCs 420 to implement a neural network model and/or a computing pipeline.

Figure 4B:
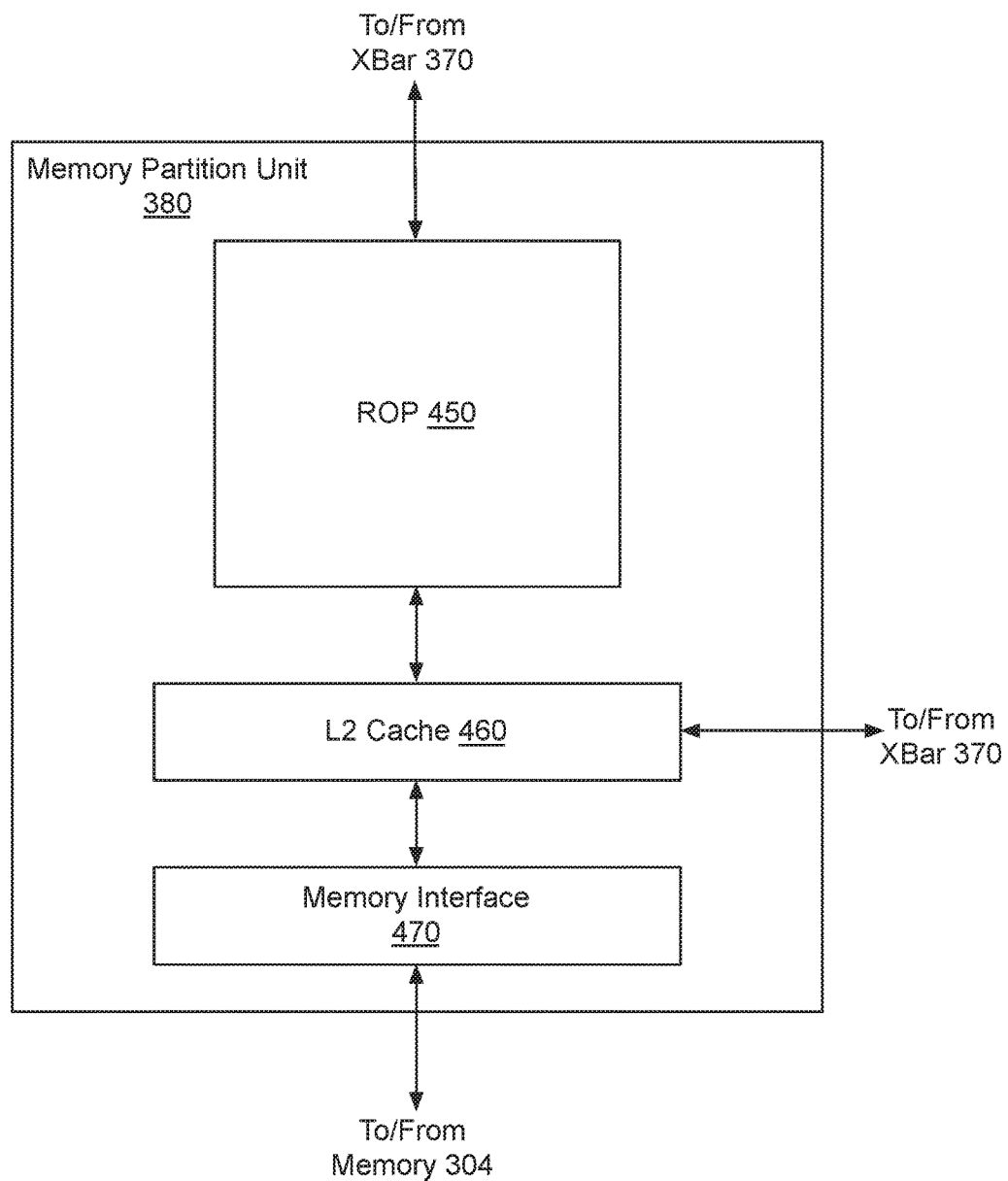
FIG. 4B illustrates a memory partition unit of the parallel processing unit of FIG. 3, in accordance with one embodiment.

The PROP unit 415 is configured to route data generated by the raster engine 425 and the DPCs 420 to a Raster Operations (ROP) unit in the partition unit 380, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In one embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory (GDDR5 SDRAM).

In one embodiment, the memory interface 470 implements an HBM2 memory interface and Y equals half U. In one embodiment, the HBM2 memory stacks are located on the same physical package as the PPU 300, providing substantial power and area savings compared with conventional GDDR5 SDRAM systems. In one embodiment, each HBM2 stack includes four memory dies and Y equals 4, with HBM2 stack including two 128-bit channels per die for a total of 8 channels and a data bus width of 1024 bits.

In one embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In one embodiment, the PPU 300 implements a multi-level memory hierarchy. In one embodiment, the memory partition unit 380 supports a unified memory to provide a single unified virtual address space for CPU and PPU 300 memory, enabling data sharing between virtual memory systems. In one embodiment the frequency of accesses by a PPU 300 to memory located on other processors is traced to ensure that memory pages are moved to the physical memory of the PPU 300 that is accessing the pages more frequently. In one embodiment, the NVLink 310 supports address translation services allowing the PPU 300 to directly access a CPU's page tables and providing full access to CPU memory by the PPU 300.

In one embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370.

Figure 5A:
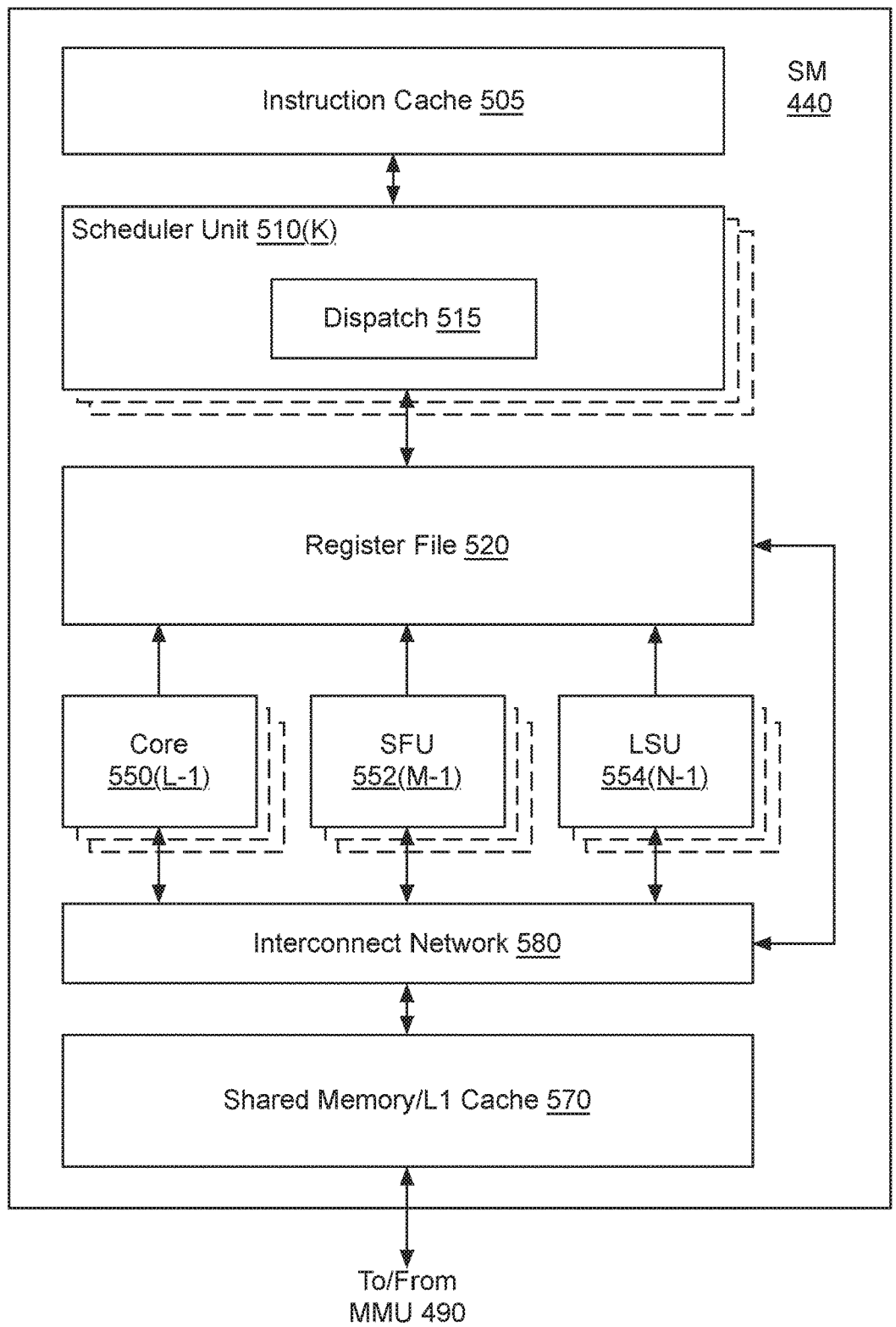
FIG. 5A illustrates the streaming multi-processor of FIG. 4A, in accordance with one embodiment.

FIG. 5A illustrates the streaming multi-processor 440 of FIG. 4A, in accordance with one embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In one embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores 550 include 64 single-precision (32-bit) floating point cores, 64 integer cores, 32 double-precision (64-bit) floating point cores, and 8 tensor cores.

Tensor cores configured to perform matrix operations, and, in one embodiment, one or more tensor cores are included in the cores 550. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In one embodiment, the SFUs 552 may include a tree traversal unit configured to traverse a hierarchical tree data structure. In one embodiment, the SFUs 552 may include texture unit configured to perform texture map filtering operations. In one embodiment, the texture units are configured to load texture maps (e.g., a 2D array of texels) from the memory 304 and sample the texture maps to produce sampled texture values for use in shader programs executed by the SM 440. In one embodiment, the texture maps are stored in the shared memory/L1 cache 470. The texture units implement texture operations such as filtering operations using mip-maps (i.e., texture maps of varying levels of detail). In one embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In one embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In one embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. In one embodiment, the PPU 300 may be configured to implement the optical flow system 150. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
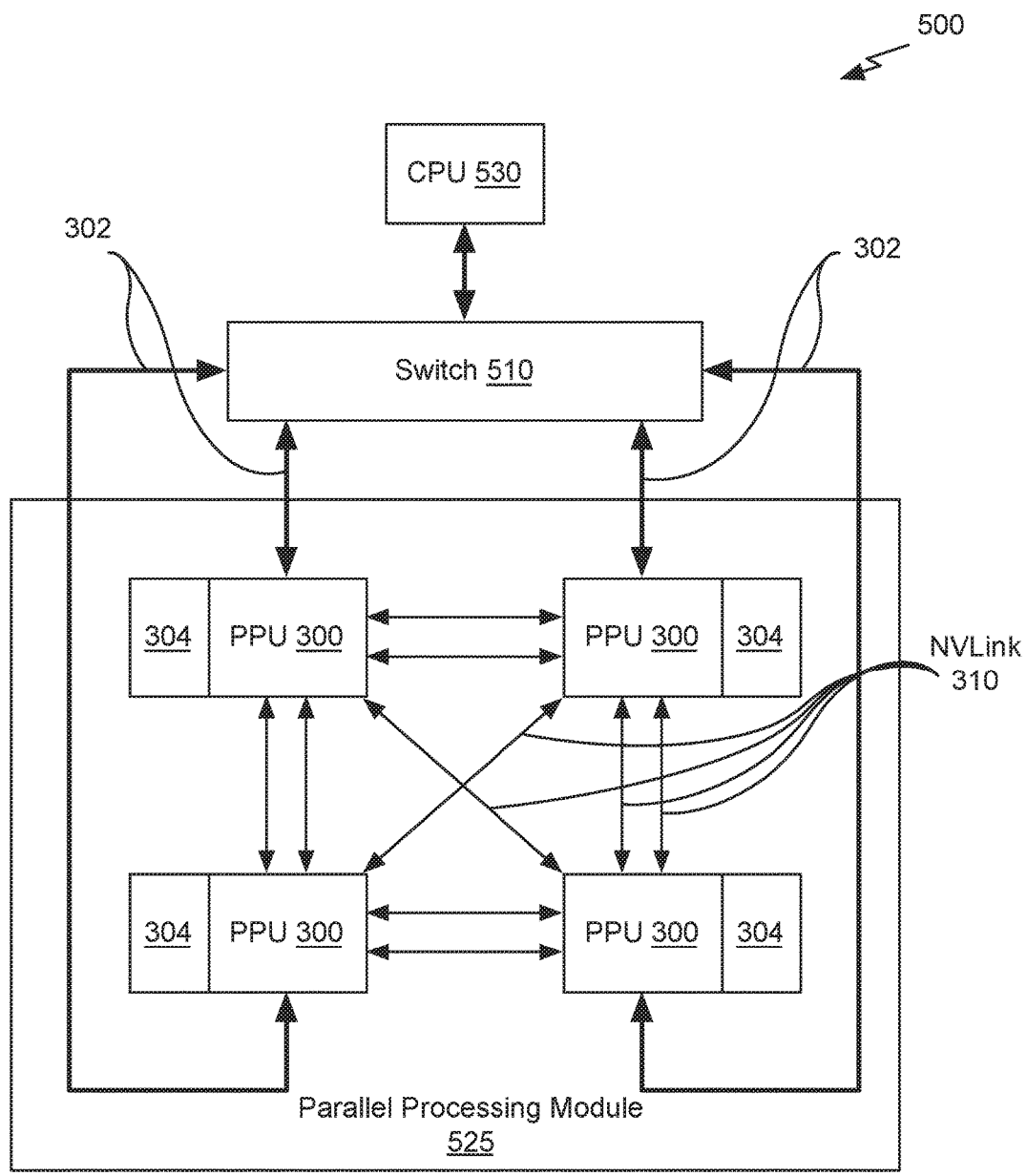
FIG. 5B is a conceptual diagram of a processing system implemented using the PPU of FIG. 3, in accordance with one embodiment.

FIG. 5B is a conceptual diagram of a processing system 500 implemented using the PPU 300 of FIG. 3, in accordance with one embodiment. The exemplary system 565 may be configured to implement the method 100 shown in FIG. 1A and/or the method shown in FIG. 2A. The processing system 500 includes a CPU 530, switch 510, and multiple PPUs 300 each and respective memories 304. The NVLink 310 provides high-speed communication links between each of the PPUs 300. The switch 510 interfaces between the interconnect 302 and the CPU 530. The PPUs 300, memories 304, and NVLinks 310 may be situated on a single semiconductor platform to form a parallel processing module 525.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In one embodiment, the CPU 530, switch 510, and the parallel processing module 525 are situated on a single semiconductor platform.

In one embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In one embodiment, the NVLink 310 allows direct load/store/atomic access from the CPU 530 to each PPU's 300 memory 304. In one embodiment, the NVLink 310 supports coherency operations, allowing data read from the memories 304 to be stored in the cache hierarchy of the CPU 530, reducing cache access latency for the CPU 530. In one embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
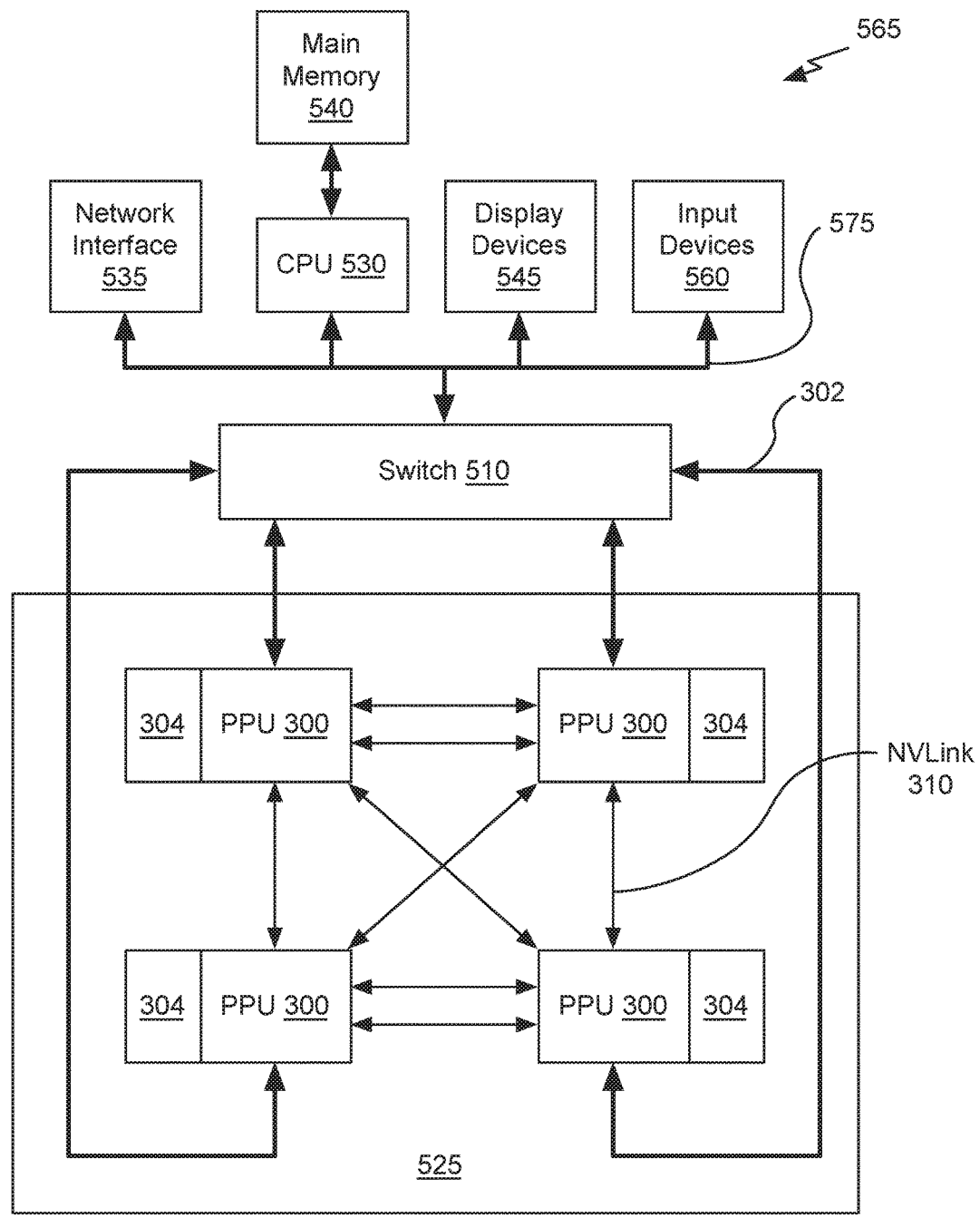
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1A and/or the method 200 shown in FIG. 2A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    generating a first pyramidal set of features for a first image;
    upsampling a first optical flow estimate that is generated by a neural network using a first level of the first pyramidal set of features and a first partial cost volume;
    warping features extracted from a second image according to the upsampled first optical flow estimate;
    computing, by the neural network, a second partial cost volume for a second level of the first pyramidal set of features using features at the second level of the first pyramidal set of features and the warped features; and
    processing, by the neural network, the features at the second level and the second partial cost volume to produce a second optical flow estimate for the first image and the second image.

2. The computer-implemented method of claim 1, wherein the features extracted from the second image are included in a second pyramidal set of features extracted from the second image.

3. The computer-implemented method of claim 2, wherein the features extracted from the second image for the level of the second pyramidal set of images are warped toward the features at the second level.

4. The computer-implemented method of claim 1, further comprising:
 convolving the first image with overlapping filters to extract the features for the first level;
 convolving the first level with additional filters to extract the features at the second level; and
 convolving the second level with additional filters to extract the features for a subsequent level of the first pyramidal set of features until a last level of the first pyramidal set of features is generated.

5. The computer-implemented method of claim 1, wherein a single layer of the neural network generates the warped features.

6. The computer-implemented method of claim 1, wherein the neural network is a convolutional neural network.

7. The computer-implemented method of claim 1, wherein a single layer of the neural network computes the second partial cost function.

8. The computer-implemented method of claim 1, further comprising processing, by the neural network, the upsampled first optical flow estimate to produce the second optical flow estimate.

9. The computer-implemented method of claim 1, wherein an initial optical flow estimate of zero is used to compute the first optical flow estimate.

10. The computer-implemented method of claim 1, further comprising repeating the computing and processing for each additional level in the first pyramidal set of features.

11. The computer-implemented method of claim 1, wherein the second image is after the first image in a video sequence.

12. The computer-implemented method of claim 1, further comprising processing the first optical flow estimate by a context network to produce a refined optical flow estimate.

13. A system, comprising:
 a parallel processing unit configured to implement a neural network and a pyramidal image feature structure generator, wherein
  the pyramidal image feature structure generator is configured to generate a first pyramidal set of features for a first image,
  a first optical flow estimate that is generated by the neural network using a first level of the first pyramidal set of features and a first partial cost volume is upsampled, and
  the neural network is configured to generate an optical flow estimate for the first image and the second image by:
   warping features extracted from a second image according to the upsampled first optical flow estimate;
   computing a second partial cost volume for a second level of the first pyramidal set of features using features at the second level of the first pyramidal set of features and the warped features; and
   processing the features at the second level and the second partial cost volume to produce a second optical flow estimate for the first image and the second image.

14. The system of claim 13, wherein the pyramidal image feature structure generator is further configured to generate a second pyramidal set of features for the second image that includes the features extracted from the second image.

15. The system of claim 14, wherein the features extracted from the second image for the level of the second pyramidal set of images are warped toward the features at the second level.

16. The system of claim 13, wherein the pyramidal image feature structure generator generates the first pyramidal set of features for a first image by:
 convolving the first image with overlapping filters to extract the features for the first level;
 convolving the first level with additional filters to extract the features at the second level; and
 the convolving the second level with additional filters to extract the features for a subsequent level of the first pyramidal set of features until a last level of the first pyramidal set of features is generated.

17. The system of claim 13, wherein a single layer of the neural network generates the warped features.

18. The system of claim 13, wherein the neural network is a convolutional neural network.

19. The system of claim 13, wherein a single layer of the neural network computes the second partial cost function.

20. A non-transitory computer-readable media storing computer instructions for estimating optical flow that, when executed by a processor, cause the processor to perform the steps of:
 generating a first pyramidal set of features for a first image;
 upsampling a first optical flow estimate that is generated by a neural network using a first level of the first pyramidal set of features and a first partial cost volume;
 warping features extracted from a second image according to the upsampled first optical flow estimate;
 computing, by the neural network, a second partial cost volume for a second level of the first pyramidal set of features using features at the second level of the first pyramidal set of features and the warped features; and
 processing, by the neural network, the features at the second level and the second partial cost volume to produce a second optical flow estimate for the first image and the second image.

* * * * *